United States Patent [19]

Flockencier

[11] Patent Number: 5,243,553

[45] Date of Patent: Sep. 7, 1993

[54] GATE ARRAY PULSE CAPTURE DEVICE

[75] Inventor: Stuart W. Flockencier, Cedar Hill, Tex.

[73] Assignee: Loral Vought Systems Corporation, Grand Prairie, Tex.

[21] Appl. No.: 724,748

[22] Filed: Jul. 2, 1991

[51] Int. Cl.⁵ .............................................. G01C 3/08
[52] U.S. Cl. ........................................... 356/5; 382/42
[58] Field of Search .............................. 356/5; 382/42

[56] References Cited

U.S. PATENT DOCUMENTS

| | | | |
|---|---|---|---|
| 3,661,465 | 5/1972 | Groh | 356/152 |
| 3,853,402 | 12/1974 | Nichols | 356/13 R |
| 3,900,261 | 8/1975 | Wingate | 356/5 |
| 3,947,119 | 3/1976 | Bamberg et al. | 356/5 |
| 3,959,641 | 5/1976 | Miller, Jr. et al. | 235/181 |
| 4,380,391 | 4/1983 | Buser et al. | 356/5 |
| 4,497,065 | 1/1985 | Tisdale et al. | 356/4 |
| 4,518,256 | 5/1985 | Schwartz | 356/5 |
| 4,527,894 | 7/1985 | Goede et al. | 356/28 |
| 4,569,599 | 2/1986 | Bolkow et al. | 368/120 |
| 4,699,507 | 10/1987 | Etoh | 356/5 |
| 4,733,961 | 3/1988 | Mooney | 356/5 |
| 4,768,877 | 9/1988 | Torregrosa et al. | 356/5 |
| 4,770,526 | 9/1988 | Manhart et al. | 356/5 |
| 4,888,477 | 12/1989 | Nankivil | 250/201 |
| 4,915,498 | 4/1990 | Malek | 356/5 |

FOREIGN PATENT DOCUMENTS 0269902 6/1988 Fed. Rep. of Germany .
56069569 8/1981 Japan .

*Primary Examiner*—Stephen C. Buczinski
*Attorney, Agent, or Firm*—Arnold, White & Durkee

[57] ABSTRACT

A gate-array pulse capture device senses, receives, and processes signals derived in response to received laser energy, i.e., signals reflected from a target. The reflected signals are initially in the form of light pulses and are converted into analog electrical signals in the detection module and passed on to the pulse capture device. The pulse capture device determines the time delay between the transmitted and received signals and the intensity of the reflected pulse, and then compares its shape to a predetermined pattern to locate the position and intensity of the peak. This information is then used by an image processor to locate and identify targets.

6 Claims, 2 Drawing Sheets

GATE ARRAY PULSE CAPTURE DEVICE

FIELD OF THE INVENTION

The present invention relates generally to a method and apparatus for sensing, receiving, and processing signals in a projectile such as a missile. More particularly, the present invention relates to a high-speed pulse capture device that receives a laser beam signal reflected from a target, processes that signal, and compares its shape to a predetermined pattern to locate the position and intensity of the peak.

BACKGROUND OF THE INVENTION

In scanning laser radar (LADAR) ranging systems, narrow laser pulses are generated and transmitted. Each transmitted pulse strikes a target of interest and reflects a portion of the transmitted pulse back to a receiver associated with the transmitter. Such LADAR systems are commonly installed in projectiles such as missiles to determine target type, location, and the range to a target. The time duration between the transmission of a pulse and the reception of the return pulse is convertible into a range.

In known systems, the transmission of the outgoing pulse starts a ramp function within the electronics of the LADAR system and the capture of the return signal terminates the ramp function. The height of the resulting ramp is directly proportional to the range to the target.

However, the shape of the return signal is not a sharp pulse. It has contour and shape. Furthermore, the shape of the pulse itself contains a great deal of useful information. For example, the shape of the return pulse may provide information regarding the size and configuration of the target. The shape may help the LADAR distinguish between different types of targets. And, the analog method of laser ranging inherently includes uncertainties in when to stop the ramp function due to variations in threshold levels.

Furthermore, ideally such an analogue system terminates the ramp functions at the center of a pulse since a pulse has a finite duration. But since the height of a pulse cannot be predetermined, a threshold must be set and this results in inaccuracies of many feet in range.

Other known systems start a fast counter when a laser pulse is transmitted and terminate the counter when the return pulse is detected. The value of the counter is then read out and the value is proportional to range. This method suffers from the same threshold uncertainties as the analogue ramp methods.

Thus, there remains a need for a digital system that reduces the uncertainties in determining a range to a target. Such a system advantageously includes a method of digitizing a return pulse and analyzing the pulse for characteristics of the pulse other than range.

SUMMARY OF THE INVENTION

The present invention provides a LADAR seeker and guidance system adapted to scan a target area with laser energy, detect the reflected laser energy, and compute range and intensity values, permitting the processing of guidance and control signals for a missile as it approaches the target. In a preferred embodiment, the system is used as a missile guidance system to identify and home in on a military target. The system is capable of generating three dimensional images of target areas by ranging on points in the imaged scene. Processing electronics are employed for actuating a LADAR transmitter and for processing the laser signals reflected from the target area. The processing system determines where a target is located, identifies the target, and provides guidance signal information such as line-of-sight rate, range, range rate, and a relative position vector (delta x,y, and z). Range and intensity information is generated for a two-dimensional array of points scanned by the LADAR seeker. Range data is obtained by measuring the time delay between transmitted and received laser light pulses emitted by the seeker. The pulses are provided by a Q-switched, solid-state laser, for example a Nd:YLF, Nd:YAG, or Nd:YVO$_4$ laser, pumped by an external, remotely located diode laser, such as a GaAlAs diode laser, for example.

Reflected laser signals received by the seeker optics are directed toward a plurality of diodes in an avalanche photo-detector array. Signals generated by the diodes, when energized by detected light pulses are amplified and digitized by an array of comparators, and a gate array samples the pulses at a 1 Ghz sampling rate, captures, and processes the pulse, generating data which is used by automatic target recognition electronics (image processor).

The circuitry employed for sensing, receiving, and processing signals derived in response to received laser energy, i.e., signals reflected from the target are primarily analog in nature. The reflected signals are initially in the form of light pulses and are converted into analog electrical signals in the detection module and passed on to a pulse capture device. The pulse capture device determines the time delay between the transmitted and received signals and the intensity of the reflected pulse, and then compares its shape to a predetermined pattern to locate the position and intensity of the peak. This information is then used by an image processor to locate and identify targets.

The present invention digitally samples a return waveform, thus capturing the entire waveform and making the entire waveform available for analysis.

BRIEF DESCRIPTION OF THE DRAWING FIGURES

DETAILED DESCRIPTION OF A PREFERRED EMBODIMENT

Figure 1:
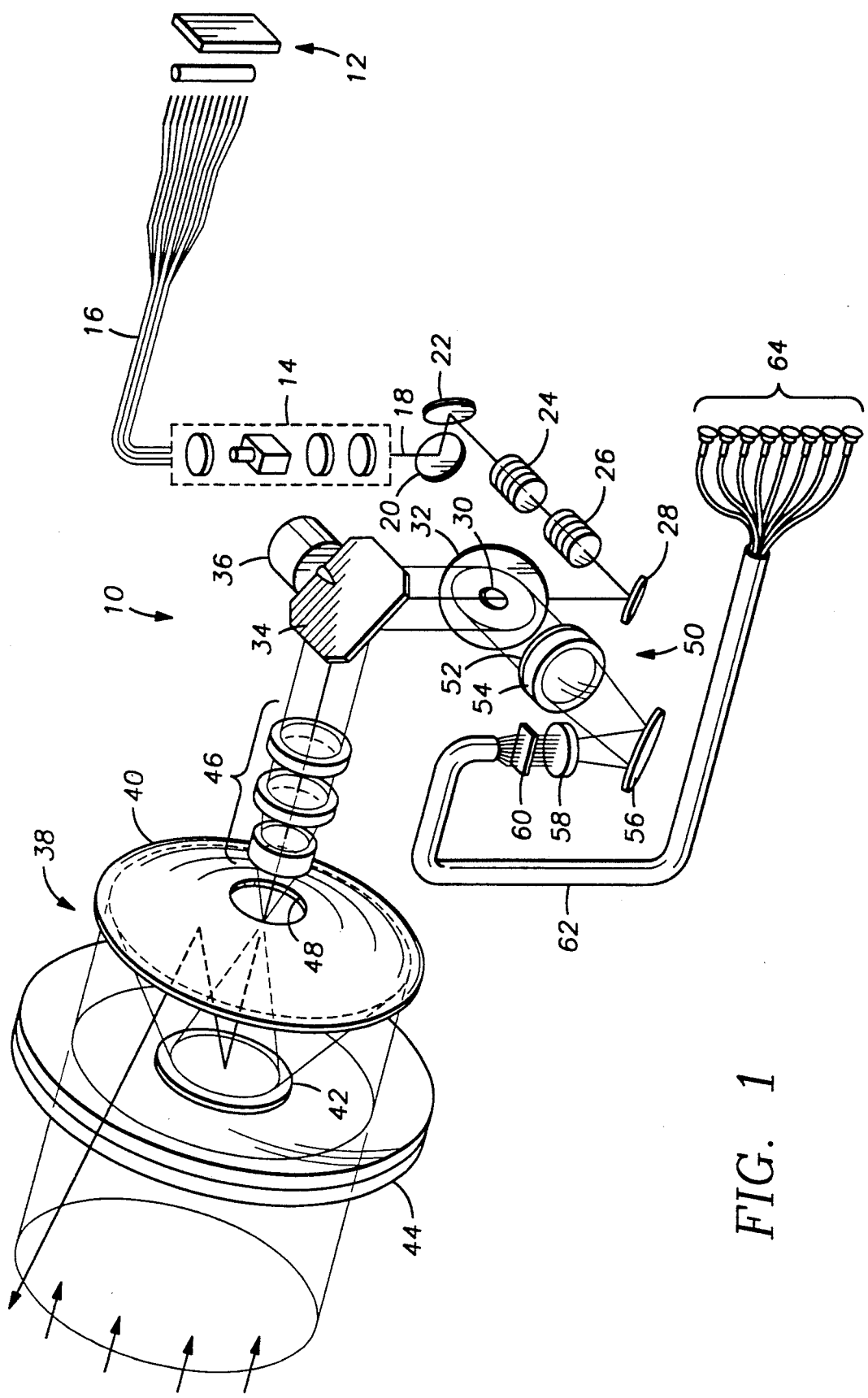
FIG. 1 is an exploded view of several components of the optical train depicting the environment of the present invention.

FIG. 1 provides an exploded view of some of the optics of a seeker head 10 and illustrates the environment in which the present invention is intended to operate. A gallium aluminum arsenide laser 12 pumps a solid state laser 14, which emits the laser light energy employed for illuminating the target. The gallium aluminum arsenide pumping laser 12 produces a continuous signal of wavelengths suitable for pumping the solid state laser 14, e.g., in the crystal absorption bandwidth. Pumping laser 12 has an output power, suitable in the 10-20 watt range, sufficient to actuate the solid state laser 14. Output signals from the pumping laser are transmitted through an input lens and through a fiber optic bundle 16 which has sufficient flexibility to permit scanning movement of the seeker head during operation.

The solid state laser 14 is suitably a Neodymium doped yttrium aluminum garnet (YAG), a yttrium lithium fluoride (YLF), a YVO$_4$ laser operable to produce pulses with widths of 10 to 20 nanoseconds, peak power levels of approximately 10 kilowatts, at repetition rates of 10–120 Khz. The equivalent average power is in the range of 1 to 4 watts. The preferred range of wavelengths of the output radiation is in the near infrared range, e.g., 1.047 or 1.064 microns.

The output beam 18 generated by solid state laser 14, in the present embodiment, is successively reflected from first and second turning or folding mirrors 20 and 22 to beam expander 24. The beam expander 24 comprises a series of (negative and positive) lenses which are adapted to expand the diameter of the beam to provide an expanded beam, suitably by an 8:1 ratio, while decreasing the divergence of the beam.

The expanded beam is next passed through a beam segmenter 26 for dividing the beam into a plurality of beam segments arrayed on a common plane, initially overlapping, and diverging in a fan shaped array. The beam segmenter 26 preferably segments the beam into 8 separate but overlapping beam segments. The divergence of the segmented beams is not so great as to produce separation of the beams within the optical system, but preferably is sufficiently great to provide a small degree of separation at the target, as the fan-shaped beam array is scanned back and forth over the target.

The resultant segmented beams are then reflected from a third turning mirror 28, passed through a central aperture 30 of an apertured mirror 32, and subsequently reflected from a scanning mirror 34 in a forward direction relative to the missile. The scanning mirror 34 is pivotally driven by a scanning drive motor 36, which is operable to cyclically scan the beam array for scanning the target area. The beam array is preferably scanned at a rate of approximately 100 Hz. The turning axis of the scanning motor is aligned in parallel with the segmenter wedges whereby the resultant beam array is scanned perpendicularly to the plane in which the beams are aligned.

An afocal, Cassigrainian telescope 38 is provided for further expanding and directing the emitted beam. The telescope 38 includes a forwardly facing primary mirror 40 and a rearwardly facing secondary mirror 42. A protective outer dome 44 of a suitable transparent plastic or glass material such as BK-7 is mounted forwardly of the secondary mirror 42. A lens structure 46 is mounted in coaxial alignment between the primary mirror 40 and the scanning mirror 34, and an aperture 48 is formed centrally through the primary mirror in alignment with the lens structure. The transmitted beams which are reflected from the scanning mirror are directed through the lens structure 46 for beam shaping, subsequently directed through the aperture 48 formed centrally through the primary mirror, and subsequently reflected from the secondary mirror 42 spaced forwardly of the primary mirror and then reflected off the primary mirror 40 and out through the transparent dome 44. The resultant transmitted beam is a fan shaped array which is scanned about an axis parallel to its plane. The beams are in side-by-side orientation mutually spaced by a center-to-center distance of twice their diameters.

The reflected radiation, i.e., laser energy reflected from the target when illuminated by the array of transmitted beams, is received by the telescope 38, and reflected successively by the primary mirror 40 and the secondary mirror 42, the lens assembly 46, and the scanning mirror 34, toward the apertured mirror 32. Because the reflected beam is of substantially larger cross-sectional area than the transmitted beam, it strikes substantially the entire reflecting surface of the apertured mirror 32, and substantially all of its energy is thus reflected laterally by the apertured mirror toward collection optics 50. The collection optics 50 includes a narrow band filter 52, for filtering out wave lengths of light above and below a desired laser wavelength to reduce background interference from ambient light. The beam then passes through condensing optics 54 for focusing the beam, and then a fourth turning mirror 56 re-directs the beam segments toward a focusing lens structure 58 adapted to focus the beam upon the receiving ends 60 of a light collection fiber optic bundle 62. The opposite ends of each optical fiber 62 are connected to illuminate diodes 64 in a detector array, whereby the laser light signals are converted to electrical signals which are conducted to a processing and control circuit of the present invention. The fiber optic bundle 62 includes nine fibers, eight of which are used for respectively receiving laser light corresponding to respective transmitted beam segments and one of which views scattered light from the transmitted pulse to provide a timing start pulse. The light received by the ninth fiber is transmitted to one of the diodes 64 of the detector array. The input ends 60 of the fibers 62 are mounted in linear alignment along an axis which is perpendicular to the optical axis. The respective voltage outputs of the detectors 64 thus correspond to the intensity of the laser radiation reflected from mutually parallel linear segments of the target area which is parallel to the direction of scan.

The circuitry of the present invention relates to a system for processing reflected signals generated by the LADAR transceiver of FIG. 1 in which signals reflected from a target area are to be processed for producing guidance correction signals. In the present system, analog LADAR signals are reflected from a target area and must be received and detected, the detection process involving comparing the received signal to an existing, stored standard (a template of a nominal signal).

Figure 2:
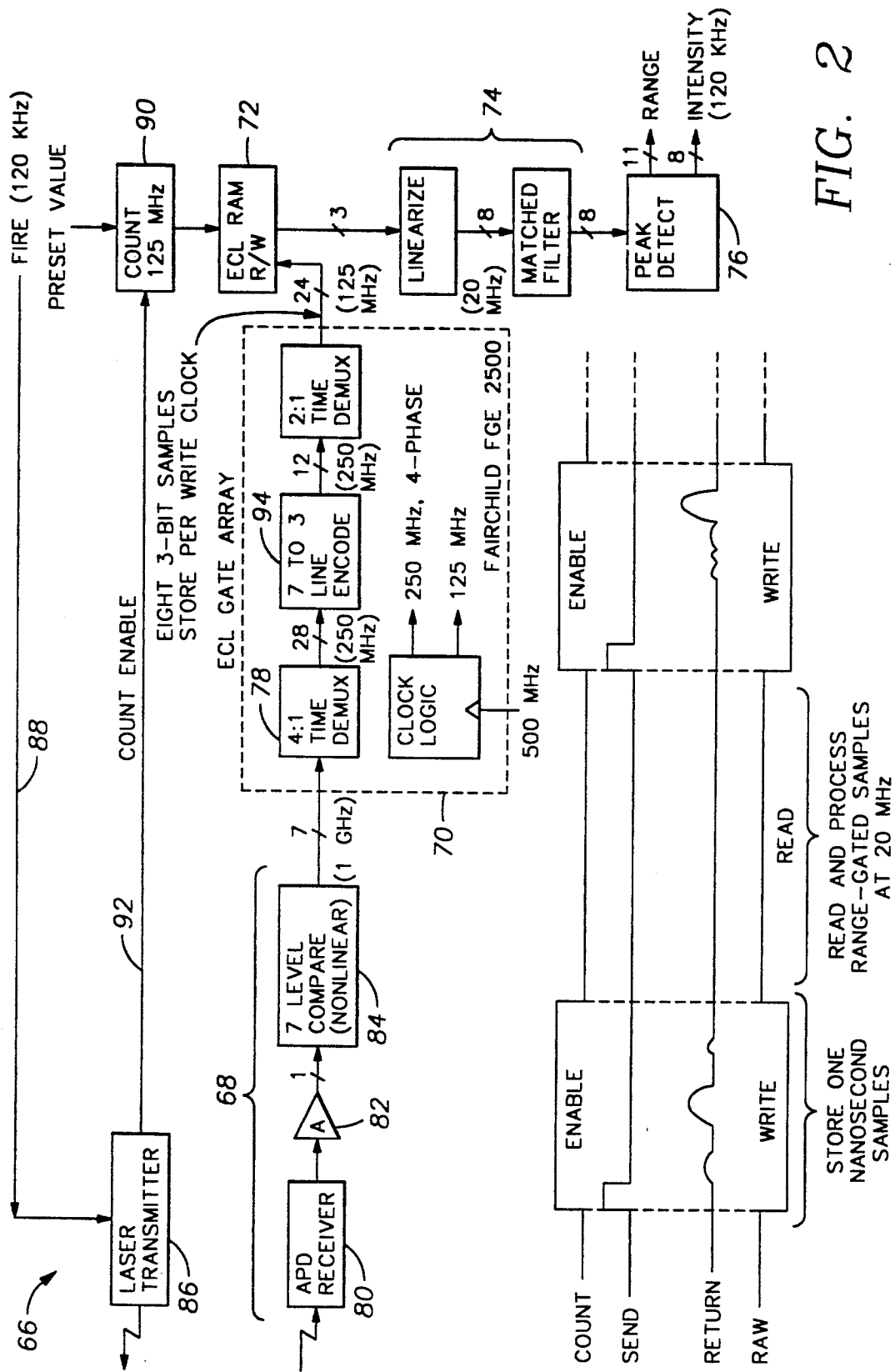
FIG. 2 is a block diagram of the processing circuitry.

FIG. 2 illustrates the pulse capture electronics 66. Bit values shown are provided by way of example and not by limitation. The pulse capture electronics subsystem initiates the firing of the laser transmitter and determines the time-of-flight (range) and intensity of the returning laser pulses. The sensor supplies eight analog electrical channels to the circuit for analysis. The pulse capture electronics (PCE) sends the results of the analysis to a processor for execution of the targeting algorithms. The PCE comprises primarily five signal processing stages: (a) analog/digital comparators 68, (b) an encode and time-demultiplex gate array 70, preferably a Fairchild FGE 2500, (c) a random access memory (RAM) buffer 72, (d) a matched-filter convolution circuit 74, and (e) a peak detector 76.

In the preferred embodiment, these stages suitably comprise a multichannel, monolithic, digital integrated circuit with an imbedded analog comparator front end.

The PCE preferably contains an emitter coupled logic (ECL) gate-array 70 that digitizes the received signal at a 1-Ghz rate to yield a ranging resolution of 15 centimeters. An ECL RAM 72 stores these one nanosecond samples during the range-gated receive period. Dead time between transmitted pulses is used to read and analyze the stored samples at a 20 Mhz rate, as required for processing. A matched filter 74 technique extracts the range and intensity information from the data stream which contains the returned pulse. This process produces accurate data under low signal-to-noise conditions and with widely varying reflectivity returns, and can isolate secondary returns from interference such as from under trees or behind camouflage nets.

By using digital analysis techniques, a more robust determination of range can be obtained under dynamic conditions than would be the case with the simpler analog ramp methods used by laser rangefinders. After the incoming data stream is digitized and stored, a detailed analysis that utilizes many time samples is performed. This analysis "slides" a template across the stored sequence of samples to find the best match. The location of this best match is proportional to the range of the captured pulse while the strength of the match is related to its intensity. The template averages or convolves many samples together to improve the signal to noise ratio and to find the center of the return pulse. Using this method, signal amplitude variations may be ignored. An appropriate template can also be used for second-pulse logic to extract secondary returns even if the later pulse is partially overlapped by a stronger primary return.

The shape of the received signal pulse is compared to that of the transmitted pulse during processing to determine time of travel, to and from the target. This method avoids certain limitations experienced in prior-art, analog edge detection systems relating to power, range, or frequency considerations.

An analog, received signal is converted to a digital signal by a one gigaHertz flash converter process. A bank of voltage comparators is employed, and comparison is accomplished by first converting each pulse signal to a string of digital signals. Each sample point work (every nano-second) equals the instantaneous amplitude of the signal received during each nanosecond. This is accomplished in the comparison circuit 68 and the gate array circuit 70.

The comparison circuit 68 preferably has seven individual comparators. The comparison circuit 68 includes an avalanche photo diode 80, an amplifier 82, and the nonlinear comparators 84. The comparators 84 are preferably flash converters ganged together spaced apart in their threshold in a logarithmic function, between 30 mV and 1 volt, based on expected return. The avalanche photo diode 80 simply converts the return light pulse into an electrical input signal. The input signal is fed to all seven comparators at once, but each has a different reference voltage, and levels being spaced in logarithmic intervals over the expected voltage range. Starting at the lower level, all the analog comparators with digital outputs operate like an operable amplifier with no feedback.

The gate array samples the status or state of the bank of comparators every nanosecond to determine how many are turned on. Every nanosecond the highest comparator turns on and is assigned a digital word (0, 1, 2 through 7). This results in a "thermometer code", meaning that all comparators up to a certain voltage level are turned on.

As shown in FIG. 2, the comparators feed the ECL gate array 70 at 1 GHz. The gate array has three functions: to sample the input waveform at 1 GHz, convert the "thermometer code" into a 3-bit word proportional to the peak of the input signal in an encoder 94, and to time de-multiplex the signal to 125 MHz compatible with the RAM 72. A 4:1 time demultiplexer is provided which, in operation, allows four nanoseconds for the encoding of a signal. From the gate array 70, eight three-bit samples are stored in the ECL RAM each write clock. After linearization in the convolution circuit 74, the samples are processed at 20 MHz. This technique simplifies the pulse capture and analysis circuit and thus reduces the cost.

A firing circuit fires a laser transmitter 86 via a firing connection 88 at 120 KHz. The time of flight of the laser pulse to a target and back to the receiver 80 is relatively short compared to the pulse repetition rate. The pulse capture device of the present invention advantageously utilizes this fact by sampling at 1 GHz and processing the samples more slowly, at 20 MHz.

The firing of the laser transmitter 86 also enables a counter 90 via a count enable 92.

While the present invention has been described in connection with a preferred embodiment, those of ordinary skill in the art will recognize many modifications to the present invention and this application is intended to cover any adaptations or variations of the invention.

We claim:

1. A high-speed laser ranging system comprising:
    a. a laser transmitter that transmits a laser pulse for reflection from a target;
    b. a detector that receives the reflection and develops analog voltages indicative of the intensity of the received reflection;
    c. a comparator coupled to the detector that develops digital values indicative of the analog voltages, wherein the comparator comprises multiple comparator circuits, each comparator circuit having a different reference voltage, and wherein the reference voltages are spaced in logarithmic intervals over a range of expected voltages;
    d. an encoder and de-multiplexer coupled to the comparator to develop time de-multiplexed digital values;
    e. a memory coupled to the encoder and de-multiplexer to store the de-multiplexed digital values;
    f. a convolver coupled to the memory to compare the de-multiplexed digital values with expected values; and
    g. a peak detector coupled to the convolver to determine the maximum value of the comparison from the convolver.

2. The system of claim 1 wherein the encoder and de-multiplexer is an ECL gate array.

3. A method of laser ranging, comprising the steps of:
    a. transmitting a laser pulse to a target creating a reflection;
    b. receiving the reflection;
    c. converting the reflection into sequential digital values indicative of the intensity of the reflection over time;
    d. encoding and de-multiplexing the digital values to develop a de-multiplexed waveform;
    e. storing the de-multiplexed waveform to develop a stored waveform;
    f. convolving the stored waveform to determine the degree of coincidence with a predetermined waveform; and
    g. determining the maximum degree of coincidence between the predetermined waveform and a series of stored waveforms to determine the range to the target.

4. The method of claim 3, wherein the step of encoding comprises the steps of sequentially delivering the converted digital values to an array of comparator circuits having reference voltages spaced in logarithmic intervals, to produce a sequence of outputs.

5. The method of claim 4, wherein the step of de-multiplexing comprises the steps of converting the sequence of outputs into a sequence of digital words and time de-multiplexing the digital words to a selected frequency.

6. The method of claim 3, wherein step (g) is performed with a peak detector.

* * * * *